(12) United States Patent
Hofmann et al.

(10) Patent No.: US 8,049,780 B2
(45) Date of Patent: Nov. 1, 2011

(54) CORRECTION OF CALIBRATION ERRORS IN AN OPTICAL INSTRUMENT

(75) Inventors: Volkmar Hofmann, Jena (DE); Thomas Marold, Jena (DE); Matthias Menzel, Jena (DE)

(73) Assignee: Trimble Jena GmbH, Jena (DE)

( * ) Notice: Subject to any disclaimer, the term of this patent is extended or adjusted under 35 U.S.C. 154(b) by 410 days.

(21) Appl. No.: 12/400,666

(22) Filed: Mar. 9, 2009

(65) Prior Publication Data
US 2009/0216476 A1    Aug. 27, 2009

Related U.S. Application Data

(63) Continuation of application No. PCT/EP2006/009026, filed on Sep. 15, 2006.

(51) Int. Cl.
*H04N 17/00* (2006.01)
*G01C 25/00* (2006.01)
*G01C 5/00* (2006.01)
*G01P 21/00* (2006.01)

(52) U.S. Cl. ............ 348/187; 356/6; 33/290; 702/94

(58) Field of Classification Search ........... 348/135, 348/139, 180, 187; 356/6; 33/281, 282, 33/284, 285, 290, 292; 702/94, 95
See application file for complete search history.

(56) References Cited

U.S. PATENT DOCUMENTS

| | | | |
|---|---|---|---|
| 7,299,556 B2 * | 11/2007 | Lippuner | 33/290 |
| 7,623,224 B2 * | 11/2009 | Vogel | 356/141.5 |
| 7,930,835 B2 * | 4/2011 | Svanholm et al. | 33/290 |
| 2004/0004706 A1 * | 1/2004 | Uezono et al. | 356/3 |
| 2004/0245437 A1 | 12/2004 | Greenberg | |
| 2006/0017817 A1 | 1/2006 | Okubo | |
| 2007/0077047 A1 * | 4/2007 | Nomura et al. | 396/55 |
| 2009/0138233 A1 * | 5/2009 | Kludas et al. | 702/158 |
| 2009/0158604 A1 * | 6/2009 | Donath et al. | 33/285 |
| 2010/0141775 A1 * | 6/2010 | Vogel | 348/187 |

FOREIGN PATENT DOCUMENTS

| | | |
|---|---|---|
| EP | 1 070 936 | 1/2001 |
| JP | 2009014368 A * | 1/2009 |
| WO | WO 2005059473 A2 * | 6/2005 |

OTHER PUBLICATIONS

First Office Action of Chinese Application No. 20060055841.6, mailed Aug. 11, 2010, 6 pages total. [English Translation Included].
International Search Report and Written Opinion of PCT Application No. PCT/EP2006/009026, mailed May 23, 2007, 12 pages total.

* cited by examiner

*Primary Examiner* — John Villecco
(74) *Attorney, Agent, or Firm* — Kilpatrick Townsend & Stockton LLP

(57) ABSTRACT

A calibration error correction device for an optical instrument includes a detector operable to detect a position of a focusing lens of an optical instrument along a mechanical path of the focusing lens. A line of sight through an image plane of the optical instrument and the focusing lens at a present position defines an actual viewing direction. The device also includes a memory configured to store viewing direction errors specifying a deviation between a known theoretical viewing direction and the actual viewing direction associated with a plurality of different positions of the focusing lens along the mechanical path and an indicator of at least one value indicative of the actual viewing direction based on the theoretical viewing direction and the viewing direction errors at each of the different positions of the focusing lens along the mechanical path.

32 Claims, 10 Drawing Sheets

CORRECTION OF CALIBRATION ERRORS IN AN OPTICAL INSTRUMENT

CROSS-REFERENCES TO RELATED APPLICATIONS

This application claims priority to and is a continuation of International Patent Application No. PCT/EP2006/009026, filed on Sep. 15, 2006, the disclosure of which is hereby incorporated by reference in its entirety for all purposes.

BACKGROUND OF THE INVENTION

The present invention relates to the correction of calibration errors, particularly for optical instruments.

Optical instruments generally comprise an arrangement of optical elements such as lenses of a telescope or camera for viewing or to focus onto an object. Further, optical instruments such as a tachymeter or a leveling device are available allowing determining a position of an object relative to a position of the optical instrument. A leveling device generally indicates the relative position of a target object based on a vertical direction only, i.e. the elevation of the target object relative to the position of the leveling device. A tachymeter, on the other hand, may indicate the position of a target with a vertical component and a horizontal component.

The position of the object may be indicated by angles specifying a deviation of a line connecting the object and the instrument from e.g. a known horizontal and/or a known vertical direction. Often, optical instruments indicate the relative position of an object by using spherical coordinates. For example, the position of an object may be defined by Cartesian coordinates defined with respect to a Cartesian coordinate system having three axes orthogonal to each other with the instrument located at the origin. For measuring positions, spherical coordinates, however, are more appropriate. The position of the object relative to the instrument may thus be defined in spherical coordinates by its distance to the origin of the orthogonal coordinate system, an angle between one of the horizontal axes of the coordinate system and a line connecting the origin of the coordinate system with a projection of the point onto the horizontal plane and finally a vertical angle between the coordinate system axis orthogonal to the horizontal plane and a line connecting the origin of the coordinate system and the point. Cartesian coordinates can be transformed into spherical coordinates and vice versa.

In all cases very precise measurements of such angles are required. Conceivably, a relatively small error in a measured angle may translate into a potentially large positioning error that may be unacceptable for example in construction applications, especially if the position of an object in a larger distance to the optical instrument is be determined.

To reduce the occurrence of measurement errors an optical instrument such as a tachymeter or leveling device usually is adjusted or calibrated. A calibration generally is performed before use of the instrument and/or upon manufacture. With the calibration measurement errors of the instrument are quantified and used for correcting an actual measurement, e.g. of a position of a target object. For example, if it is known from a test measurement that an optical instrument determines a viewing direction with a 1 degree error, an actual measurement can be corrected by compensating for the 1 degree error, i.e., adding or subtracting 1 degree from the measurement result depending on the direction of the 1 degree measurement error. The determined measurement error can be used to set the initial adjustment of the optical instrument, such as an indicator of an angle or used to correct an angle indicated by the instrument.

While the above outlined calibration of optical instruments works well for many applications, error sensitive applications may require an error correction with higher accuracy. Moreover, applications requiring a large number of consecutive measurements may require repeated calibration steps for calibrating the optical instrument, thus reducing productivity.

SUMMARY OF THE INVENTION

It is therefore desirable to provide for a calibration error correction device that improves the accuracy of an error correction and that improves productivity by eliminating the performance of multiple calibration steps during use of an optical instrument.

According to an embodiment a calibration error correction device for an optical instrument comprises a detector of a position of a focusing lens of an optical instrument along a mechanical path of the focusing lens, wherein a line of sight through an image plane of the optical instrument and the focusing lens at a present position defines an actual viewing direction, a memory holding viewing direction error specifying a deviation between a known theoretical viewing direction and the actual viewing direction associated with a plurality of different positions of the focusing lens along the mechanical path, and an indicator to specify at least one value indicative of the actual viewing direction based on the theoretical viewing direction and the viewing direction errors at each of the different positions of the focusing lens along the mechanical path. Accordingly, the calibration error correcting device can provide or a calibration error correction for different focus settings of the optical instrument by using prestored viewing direction errors associated with the different focus settings of the instrument.

According to an advantageous example, the viewing direction errors are defined by a difference between the theoretical viewing direction and the actual viewing direction and the indicator unit is arranged to specify the actual viewing direction by subtracting the viewing direction errors from the theoretical viewing direction. Accordingly, corrected actual viewing direction can be indicated as a result of considering viewing direction errors at a particular position of the focusing lens.

According to another advantageous example the viewing direction errors each comprise a first component, e.g. vertical component, indicating a deviation between the theoretical viewing direction and the actual viewing direction in a first plane, e.g. vertical plane and, according to another example the viewing direction errors each comprise a second component, e.g. orthogonal to the first component such as a horizontal component indicating a deviation between the theoretical viewing direction and the actual viewing direction in a second plane, e.g. horizontal plane. Accordingly, the correction of viewing direction errors may take place in one dimension, such as for a leveling device, or in two dimensions, such as for a Tachymeter.

According to another advantageous example the image plane includes a first line segment, e.g. vertical line segment, and a second line segment, e.g. horizontal line segment, crossing each other in the image plane and the actual viewing direction is defined by a line of sight through the crossing and the focusing lens. Accordingly, a user of the optical instrument is in the position to conveniently determine the actual viewing direction by converging the crossing and an object viewed through the focusing lens.

According to another advantageous example the image plane is constituted by a two-dimensional array of sensor element and the actual viewing direction is defined by a line of sight through a point, e.g. the center of the two-dimensional arrangement of sensor elements and through the focusing lens. The calibration error correction device thus can be made suitable for example for a video Tachymeter.

According to another advantageous example the theoretical viewing direction is calibrated by setting focusing lens to a selected focus position. Also, the theoretical viewing direction may be calibrated by approximating the actual viewing direction upon manufacture of the optical instrument. Accordingly, the theoretical viewing direction can be defined as a desired or approximated viewing direction at an arbitrary point in time during manufacture of the optical instrument or during initial adjustment of device characteristics.

According to another advantageous example a positioning unit is provided to position the focusing lens to focus onto a target and indicate the position of the focusing lens along the mechanical path and, the indicator unit may be adapted to retrieve a viewing direction error associated with the position of the focusing lens based on the position signal indicated by the positioning unit to specify at least one value indicative of the actual viewing direction. Accordingly, the focusing lens may be adjusted to a desired position that is used to obtain an associated viewing direction error and a calibration error at the position can be corrected.

According to another advantageous example a distance determining unit is provided to determine a distance of a target from the optical instrument and the positioning unit can be adapted to set a position of the focusing lens along the mechanical path to focus onto the target based on the distance, and the indicator unit may be adapted to retrieve a viewing direction error associated with the target distance and to specify at least one value indicative of the actual viewing direction. Thus, the requirement of manual adjustment of the focusing lens can be avoided and the calibration error at the focusing lens position can be directly compensated based on the measured distance to a target.

According to another advantageous example the indicator unit is arranged to specify the actual viewing direction based on an interpolation between two viewing direction errors, if a present position of the focusing lens along the mechanical path is not associated with a stored viewing direction error. Thus, if viewing direction errors are known only at selected positions of the focusing lens, viewing direction errors at other positions can be inferred therefrom in order to enable a calibration error correction at positions without directly associated viewing direction errors.

According to another advantageous example a calibration unit is provided to effect movement of the focusing lens to each of the plurality of positions along the mechanical path and to determine viewing direction errors thereat. For calibration of the optical instrument a calibration unit can therefore record viewing direction errors at different positions of the focusing lens for later use in correcting viewing direction errors during regular operation.

According to another advantageous example the calibration unit is adapted to adjust the line of sight or actual viewing direction to targets on the same elevation as the optical instrument and to record an angle of the optical instrument to horizontal direction as viewing direction error. Accordingly, the calibration unit can be used in association with for example leveling devices.

According to another advantageous example the calibration unit is adapted to determine a viewing direction error as a mean between a measurement of a viewing direction error of the optical instrument in a first face and a measurement of a viewing direction error of the optical instrument in a second face. Accordingly, viewing direction errors, e.g. at determined known positions of the focusing lens, can be determined by consecutively moving a viewing element of the optical instrument, such as a telescope or camera into a first and second face and by obtaining the error as a mean between the measurement in the two faces.

According to another advantageous example the calibration unit is adapted to determine a viewing direction error associated with a position of the focusing lens along the mechanical path as a mean between repeated measurements of viewing direction errors at this position of the focusing lens along the mechanical path. Accordingly, measurement errors can be reduced to a minimum.

According to another advantageous example the calibration unit is adapted to determine a viewing direction error as a mean between repeated measurements of viewing direction errors at two different positions of the focusing lens along the mechanical path and the viewing direction error is associated with a middle position of the focusing lens along the mechanical path between the two different positions. Accordingly, the calibration unit can also be employed for example in a video Tachymeter.

According to another advantageous example a unit to measure and compensate for a tilt error can be provided, in order to further improve handling and error correction.

According to another embodiment a method for calibration error correction is provided including detecting a position of a focusing lens of an optical instrument along a mechanical path of the focusing lens, wherein a line of sight through an image plane of the optical instrument and the focusing lens at a present position defines an actual viewing direction, holding viewing direction errors specifying a deviation between a known theoretical viewing direction and the actual viewing direction associated with a plurality of different positions of the focusing lens along the mechanical path in a memory, and specifying at least one value indicative of the actual viewing direction based on the theoretical viewing direction and the viewing direction errors at each of the different positions of the focusing lens along the mechanical path.

According to another embodiment a program can be provided including instructions adapted to cause data processing means to carry out a method with the above features.

According to another example a computer readable medium embodying the program may be provided.

According to another embodiment a computer program product may comprise the computer readable medium.

According to another embodiment an optical instrument is provided comprising the calibration error correction device.

According to another embodiment an optical instrument is provided, calibrated in accordance with the above method steps.

Further advantageous features of the invention are disclosed in the claims.

DETAILED DESCRIPTION OF THE INVENTION

Preferred embodiments of the invention are described with reference to the figures. It is noted that the following description contains examples only and should not be construed as limiting the invention.

Embodiments of the invention generally relate to a calibration of optical instruments to improve an accuracy of positional measurements using the optical instrument. Viewing direction errors of a direction measured by the optical instrument are recorded at different positions of a focusing lens along a mechanical path of the focusing lens such as in a telescope of the optical instrument. With the viewing direction errors known at different positions of the focusing lens corresponding to different distances to target objects, positional measurements over a distance range can be made more accurate.

Figure 1:
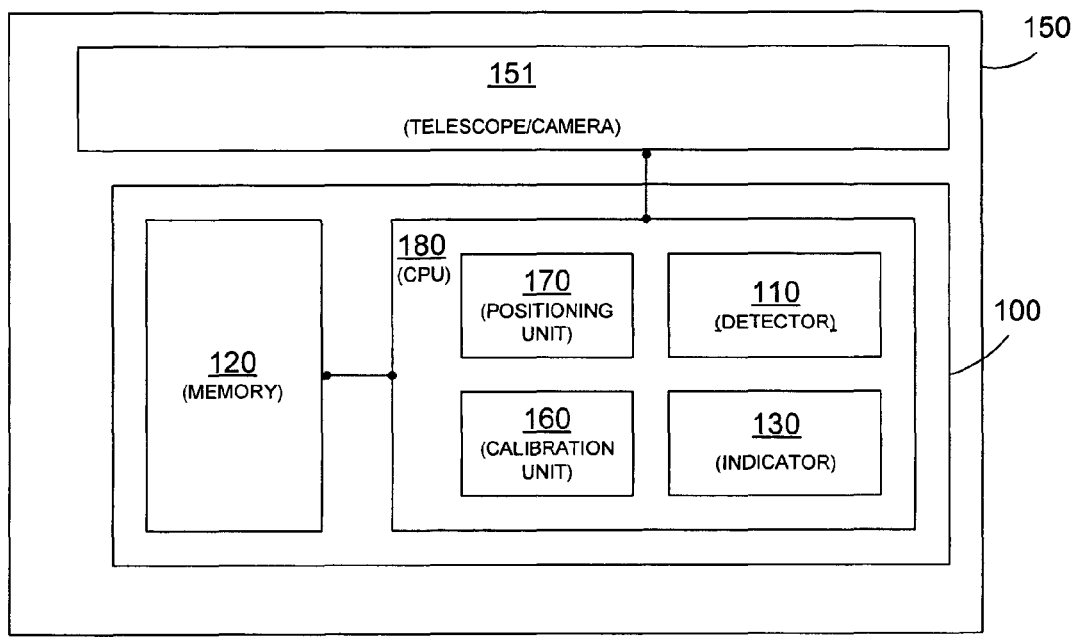
FIG. 1 illustrates elements of a calibration error correction device in an optical instrument according to an embodiment of the invention.

FIG. 1 illustrates elements of an optical instrument 150 with a calibration error correcting device according to an embodiment of the invention.

FIG. 1 illustrates a calibration error correcting device 100 employed in an optical instrument 150 for performing a calibration error correction of optical characteristics of the optical instrument. While in FIG. 1 the calibration error correcting device is shown to form part of the optical instrument, in alternate examples it may constitute a separate entity used in cooperation with the optical instrument.

The optical instrument 150 includes an optical arrangement 151, such as at least one of a telescope or camera including a focusing lens movable along a mechanical path in order to focus onto a target object. In addition to the focusing lens the optical arrangement may further comprise an image plane, and when viewing through the optical arrangement 151, a line of sight is through the image plane of the arrangement and the focusing lens at a present position along the mechanical path of the focusing lens may define an actual viewing direction. The actual viewing direction thus is a direction of sight through the optical arrangement, such as through an eye piece of a telescope. Additionally, the optical arrangement 151 may include a lens arrangement for achieving desired optical properties, such as a magnification, etc.

The calibration error correcting device 100 comprises a detector 110 for detecting a position of a focusing lens of the optical instrument 150 along the mechanical path of the focusing lens, such as the mechanical path of the focusing lens in a telescope of the optical instrument. A line of sight through an image plane of the optical instrument and the focusing lens at a current position of the focusing lens defines thereby an actual viewing direction.

Moreover, the calibration error correcting device comprises a memory 120 holding viewing direction errors specifying a deviation between a known theoretical viewing direction and the actual viewing direction associated with a plurality of different positions of the focusing lens along the mechanical path of the focusing lens. Still further, the calibration error correcting device 100 comprises an indicator 130 to specify at least one value indicative of the actual viewing direction based on the theoretical viewing direction and the viewing direction errors at each of the different positions of the focusing lens along the mechanical path. The memory 120 may store associations between different positions of the focusing lens along the mechanical path and corresponding viewing direction errors. Alternatively, the memory 120 may store viewing direction errors specifying a deviation between a known theoretical viewing direction and the actual viewing direction associated with a plurality of different distances of the optical instrument to a target object, as the different distances directly correspond to the different positions of the focusing lens along the mechanical path of the focusing lens.

The viewing direction errors specifying the deviation between the known theoretical viewing direction and the actual viewing direction may be recorded for example during an initial setup of the device so as to make available in the memory viewing direction errors associated with individual positions of the focusing lens so that during regular operation of the optical instrument a calibration error correction can be readily performed.

Surveying instruments such as theodolites or tacheometers, also known as tachymeters or total stations, generally make use of spherical coordinate in order to indicate positions in space. For example, the position of a point may be defined by Cartesian coordinates defined with respect to a Cartesian coordinate system having three axes orthogonal to each other. For measuring positions, spherical coordinates, however, are more appropriate. The position of a point may accordingly be defined in spherical coordinates by its distance to an origin of an orthogonal coordinate system, an angle between one of the horizontal axes of the coordinate system and a line connecting the origin of the coordinate system with a projection of the point onto the horizontal plane and finally a vertical angle between the coordinate system axis orthogonal to the horizontal plane and a line connecting the origin of the coordinate system and the point. Cartesian coordinates can be transformed into spherical coordinates and vice versa.

To determine a position of an object, the coordinate system may be centered at the optical instrument and the axes of the coordinate system may be aligned with known directions, such as a vertical direction and a horizontal direction and the horizontal direction may be aligned with a point of compass, such as north.

In accordance with the above the optical instrument 150 may comprise an arrangement of lenses, such as a telescope 151 rotatable about a vertical axis and a tilting axis that can be rotated with rotation of the lens arrangement or telescope about the vertical axis. The angles of rotation about the vertical axis and angles of tilting about the tilting axis in surveying instruments such as tachymeters may be read from a corresponding horizontal circle and a vertical circle indicating angles of rotation or corresponding display device based indications of angles. In this connection it is noted that the vertical and horizontal circle in one example may be mechanical circles including indicators for indicating an angle, and may also be constitute by digital or any other type of indications of such angles.

Ideally, the line of sight or actual viewing direction defined by the optical arrangement or telescope is adjusted such that the angles of the actual viewing direction or line of sight to the respective axes of the coordinate system coincide with the angles indicated on the horizontal circle and vertical circle of the optical instrument.

Thus, if the orientation of the coordinate system is known, positions of a target object can be precisely determined, as the angles indicated on the vertical circle and horizontal circle coincide with the real angles between the actual viewing direction and the known coordinate system.

However, real optical instruments do not meet the condition described above, i.e., an actual viewing direction will deviate from the known or preset orientation of the coordinate system. For example, if a direction defined by—predetermined settings of the optical instrument, i.e. of the optical arrangement or telescope, in accordance with the vertical and horizontal circle is considered to define a theoretical viewing direction, an error will be present between this theoretical viewing direction and the actual viewing direction. This deviation may have a vertical component and a horizontal component, depending on the type of the optical instrument.

It is conceivable that during manufacturing of the optical instrument the deviation between the actual viewing direction and the theoretical viewing direction will be kept as small as possible, e.g. by calibrating or adjusting the theoretical viewing and corresponding position indications such as angles as an approximation of the actual viewing direction in an initial setting of the device. For example, the actual viewing direction, i.e. line of sight, could be targeted onto a known object in a known direction from the optical instrument and the vertical and horizontal circles or other indications of angles or positions may be adjusted accordingly for initial adjustment or calibration of the theoretical viewing direction.

In an example the theoretical viewing direction is calibrated by setting focusing lens to an a selected focus position. Also, the theoretical viewing direction may be calibrated by a unit to approximate the actual viewing direction upon manufacture of the optical instrument by aligning the actual viewing direction with the theoretical viewing direction upon manufacture of the optical instrument. For example a detector detects the actual viewing direction and an actuator adjusts the value indicated by the indicator in accordance with the measurement to align the actual viewing direction and the theoretical viewing direction, at least at the present focus position, i.e. for the present position of the focusing lens. The calibration unit may be a device or a group of devices that cooperate during manufacture in aligning and adjusting the telescope or camera of the optical instrument with the indicator of the viewing direction, e.g. an angle of 0 degrees. Accordingly, the theoretical viewing direction can be defined as a desired or approximated viewing direction at an arbitrary point in time during manufacture of the optical instrument or during initial adjustment of device characteristics.

The initial calibration of the device by attempting to obtain a coincidence of the actual viewing direction and the once or initially adjusted theoretical viewing direction in practical cases will not be accurate, i.e., a certain calibration error will remain. Moreover, it can be noted that the direction or deviation of the actual viewing direction from the theoretical viewing direction depends on a position of a focusing lens of the optical instrument along a path of the focusing lens, i.e. focus position, and that therefore the viewing direction errors between the actual viewing direction and the theoretical viewing direction also depend on the position of the focusing lens along the mechanical path.

To address this circumstance the invention provides for a memory holding viewing direction errors at individual positions of the focusing lens along the mechanical path of the focusing lens. For example the viewing direction errors are stored in correspondence to individual positions of the focusing lens or the associated distances to a target object and used during regular operation of the instrument, to enable an indication of at least one corrected value of the actual viewing direction based on the initially calibrated theoretical or approximated viewing direction and the viewing direction error at the position of the focusing lens. Accordingly, the calibration error correcting device can provide or a calibration error correction for different focus settings of the optical instrument by using prestored viewing direction errors associated with the different focus settings or target distances of the instrument to a target.

According to another embodiment the viewing direction errors are defined by a difference between the theoretical viewing direction and the actual viewing direction and the indicator is arranged to specify the actual viewing direction by subtracting the viewing direction errors from the theoretical viewing direction.

The stored viewing direction errors may each comprise a vertical component indicating a deviation between the theoretical viewing direction and the actual viewing direction in a vertical plane and may comprise a horizontal component indicating a deviation between the theoretical viewing direction and the actual viewing direction in a horizontal plane. Accordingly, the correction of viewing direction errors may take place in one dimension, such as for a leveling device, or in two dimensions, such as for a Tachymeter.

In an example there is provided an image plane including a horizontal line segment and a vertical line segment crossing each other in the image plane and the actual viewing direction is defined by a line of sight through the crossing and the focusing lens. A user of the optical instrument is thus in the position to conveniently determine the actual viewing direction by converging the crossing and an object viewed through the focusing lens.

Alternatively image plane is provided constituted by a two-dimensional array of sensor element and the actual viewing direction is defined by a line of sight through a point on or an element of the two-dimensional arrangement of sensor elements, e.g. at or near a center of the arrangement of sensor elements, and through the focusing lens. The calibration error correction device thus can be made suitable for example for a video Tachymeter, In another example the theoretical viewing direction is calibrated by setting focusing lens to a selected focus position such as to an infinite focus position. Alternatively, the theoretical viewing direction may be calibrated by approximating the actual viewing direction upon manufacture of the optical instrument. The above calibration may include a unit to adjust angle circles or other indicators of angles to indicate a reference angle or angles such as "0 degrees" for the theoretical viewing direction. Accordingly, the theoretical viewing direction can be defined as a desired or approximated viewing direction at an arbitrary point in time during manufacture of the optical instrument or during initial adjustment of device characteristics.

According to another example, the calibration error correcting device 100 includes a positioning unit 170 for positioning the focusing lens along the mechanical path, for controlling a focus of the optical instrument with the telescope or camera 150.

The focusing lens may thus be positioned along the mechanical path using the positioning unit 170 to focus onto a target object and the position of the focusing lens along the mechanical path is indicated. A viewing direction error associated with the position of the focusing lens is then retrieved based on the position signal indicated by the positioning unit 170 to specify at least one value indicative of the actual viewing direction. For example, Accordingly, the focusing lens may be adjusted to a desired position that is used to obtain an associated viewing direction error and a calibration error at the position can be corrected.

According to another example a target distance of a target from the optical instrument is determined and a position of the focusing lens along the mechanical path is set to focus onto the target based on the determined target distance, such as by the positioning unit 170. Thus, the requirement of manual adjustment of the focusing lens can be avoided and the calibration error at the focusing lens position can be directly compensated. Moreover, in this case the memory may store associations between different target distances and corresponding viewing direction errors and the indicator unit may retrieve a viewing direction error associated with a target distance and specify at least one value indicative of the actual viewing direction based thereon.

According to another example the actual viewing direction is specified based on an interpolation between two viewing direction errors, if a present position of the focusing lens along the mechanical path is not associated with a stored viewing direction error. Thus, if viewing direction errors are known only at selected positions of the focusing lens, viewing direction errors at other positions can be inferred therefrom in order to enable a calibration error correction at positions without directly associated viewing direction errors.

According to another example movement of the focusing lens to each of the plurality of positions along the mechanical path is effected and viewing direction errors thereat are determined.

According to another embodiment a calibration unit is provided for calibrating the optical instrument such as in an initial sequence of calibration operations to record viewing direction errors at different positions of the focusing lens for later use in correcting viewing direction errors during regular operation.

In an example the calibration unit is partially formed as an integral part of the optical instrument, including and of the calibration error correcting device and partially formed by elements external to the optical instrument.

The calibration unit may issue commands to effect movement of the focusing lens to each of the plurality of positions along the mechanical path and to determine viewing direction errors thereat such as by commanding a stepper motor connected to the focusing lens and a motor drive for adjusting the optical instrument and by recording the viewing direction error. In another example the calibration unit includes actuators or motors to adjust the line of sight or actual viewing direction to targets on the same elevation as the optical instrument and a recorder or sensor to record an angle of the optical instrument to horizontal direction as viewing direction error. A calculator may be provided with the calibration unit to calculate a viewing direction error as a mean between a measurement of a viewing direction error of the optical instrument in a first face and a measurement of a viewing direction error of the optical instrument in a second face. Also the calculator may determine a viewing direction error associated with a position of the focusing lens along the mechanical path as a mean between repeated measurements of viewing direction errors at this position of the focusing lens along the mechanical path. Alternatively the calculator may determine a viewing direction error as a mean between repeated measurements of viewing direction errors at two different positions of the focusing lens along the mechanical path and wherein the viewing direction error is associated with a middle position of the focusing lens along the mechanical path between the two different positions.

According to another example a line of sight or actual viewing direction is adjusted to a target on the same elevation as the optical instrument and an angle of the optical instrument to horizontal direction is recorded as viewing direction error. Accordingly, the calibration unit can be used in association with for example leveling devices.

According to another example a viewing direction error is determined as a mean between a measurement of a viewing direction error of the optical instrument in a first face and a measurement of a viewing direction error of the optical instrument in a second face. Accordingly, viewing direction errors, e.g. at determined known positions of the focusing lens, can be determined by consecutively moving a viewing element of the optical instrument, such as a telescope or camera into a first and second face and by obtaining the error as a mean between the measurement in the two faces.

According to another example a viewing direction error associated with a position of the focusing lens along the mechanical path is determined as a mean between repeated measurements of viewing direction errors at this position of the focusing lens along the mechanical path. Accordingly, measurement errors can be reduced to a minimum.

According to another example the a viewing direction is determined as a mean between repeated measurements of viewing direction errors at two different positions of the focusing lens along the mechanical path and the viewing direction error is associated with a middle position of the focusing lens along the mechanical path between the two different positions. Accordingly, the calibration unit can also be employed for example in a video Tachymeter.

According to another example measurement and compensation for a tilt error can be provided, in order to further improve handling and error correction.

In the following the elements of the calibration error correcting device 100 are further described by way of example. It is noted that the following constitutes examples only and should not be construed as limiting the invention as claimed.

According to an example the calibration error correcting device 100 is integrally formed with the optical instrument such as a total station, tachymeter, video total station, theodolite, as described in WO 2005/059473A2 and PCT/EP2005/000228, hereby incorporated by reference, or leveling device. However, according to another example the calibration error correcting device is embodied in a standalone unit or other device such as a computing device for cooperation with the optical instrument. A communication may be short range or long range via a wireline or wireless connection between the calibration error correcting device and the optical instrument. The communication may involve computer networks and mobile networks.

The calibration error correcting device may comprise a central processing unit and a memory for storing instructions to carry out the functionality of the detector 110 and the indicator 130 on the basis of a detected position of the focusing lens and an associated viewing direction error held in the memory 120. Alternatively the calibration error correcting device at least partially is realized by a hardware arrangement, such as by hard wired circuits, ASICs (Application Specific Integrated Circuit), devices such as motors, sensors for determining positions, focus, distances, etc.

In an example the optical instrument 150 comprises a central processing unit (CPU) 160 for controlling the operation of the optical instrument, such as a focus control, measurements of target objects for determining distances and positions, etc. The functionality of the detector 110, the indicator 130, the positioning unit 170 and the calibration unit 160 may at least partially be realized by the central processing unit based on code sequences of a program or program elements available in a memory accessible by the central processing unit, e.g. memory 120, the programs or program elements having coded instructions to cause the central processing unit to detect a position of the focusing lens along the mechanical path, to access the memory 120 of viewing direction errors, to indicate the actual viewing direction as outlined above, to position the focusing lens and to perform the calibration operations of the optical instrument. While in FIG. 1 the detector 110, the indicator 130, the positioning unit 170 and the calibration unit 160 are shown as fully comprised by the central processing unit, they may have elements external to the central processing unit, such as sensors, a display, actuators, etc. connected to or accessible by the central processing unit.

Further thereto other functions of the optical instrument, such as of a total station, tachymeter, video total station, theodolite or leveling device may be realized by the central processing unit, although not illustrated in the FIG. 1 for simplicity.

The detector 110 may be arranged to detect the position of the focusing lens moved along a spindle moving the focusing lens along the mechanical path, such as by counting the number of rotations of the spindle with regard to a known reference. For example, the detector may be arranged to detect pulses from a stepper motor rotating the spindle to move the focusing lens or by any other means for detecting the number of rotations of the spindle. Alternatively, the detector may include a sensing element for sensing the position of the focusing lens, for example by electrical, mechanical or optical means.

Preferably, the detector yields an indication of an actual position of the focusing lens, enabling the calibration error correcting device to make reference to correspondingly stored viewing direction errors in the memory 120.

In an example the memory 120 is constituted by an EEPROM or any other memory device. The memory 120 preferably stores viewing direction errors in association with a plurality of positions of the focusing lens along the mechanical path. The viewing direction errors are constituted by a single component or constituted by multiple components, such as one for each one of a plurality of spatial directions or spherical coordinates. For example, the memory 120 may hold association with a particular position of the focusing lens along the mechanical path a deviation between the actual viewing direction and the known theoretical viewing direction as viewing direction error, in the form of an angle in vertical direction and/or an angle in horizontal direction.

The indicator 130 in one example includes a display for displaying at least one value of the actual viewing direction, i.e., the corrected actual viewing direction in order to eliminate any deviation or error between the actual viewing direction and the theoretical viewing direction. The indicator display may be provided for displaying the corrected actual viewing direction so that a position of a target object in spherical coordinates may be determined without calibration error depending on a position of the focusing lens along the mechanical path. The indicator may include the relevant elements for obtaining the value indicative of the corrected actual viewing direction, such as means to calculate from the known theoretical viewing direction and the viewing direction error the corrected actual viewing direction, such as by subtracting the viewing direction error from the theoretical viewing direction.

In an example the indicator 130 is a unit integrated into the optical instrument or a housing of the optical instrument to provide a visual indication of digital or analogue values representing angles, positions in space, etc. for a user operating the optical instrument.

Moreover, the indicator may include a display such as a display for digital values. One example of such display is a TFT display or any other kind of flat screen display. In yet another alternative the indicator does not comprise a display unit, but instead provide the value indicative of the corrected actual viewing direction to outside equipment, e.g. for further processing or handling. For example the values may be provided to an external recording unit for storage, to a transmission unit for transmission to other units the optical instrument is in communication with, such as other optical instruments, a computing device such as a laptop computer or to a central office etc. Also, the values may be transferred to a processor, e.g. for generating or correcting maps or other representation of a landscape, building etc. The values may also be transferred to a manufacturing site as a feedback in order to adjust a manufacturing process.

According to another example the calibration error correction device 100 comprises a positioning unit 170 to position the focusing lens to focus onto a target and to indicate the position of the focusing lens along the mechanical path. The positioning unit can include means for physically moving the focusing lens to a desired position along the mechanical path of the focusing lens. For example, the positioning unit may include the above-mentioned arrangement comprising a spindle and stepper motor for rotating the spindle in order to move the lens along the mechanical path to focus onto a target object. The stepper motor output, such as pulses, may be delivered to the detector of the position of the focusing lens for further processing.

Figure 9:
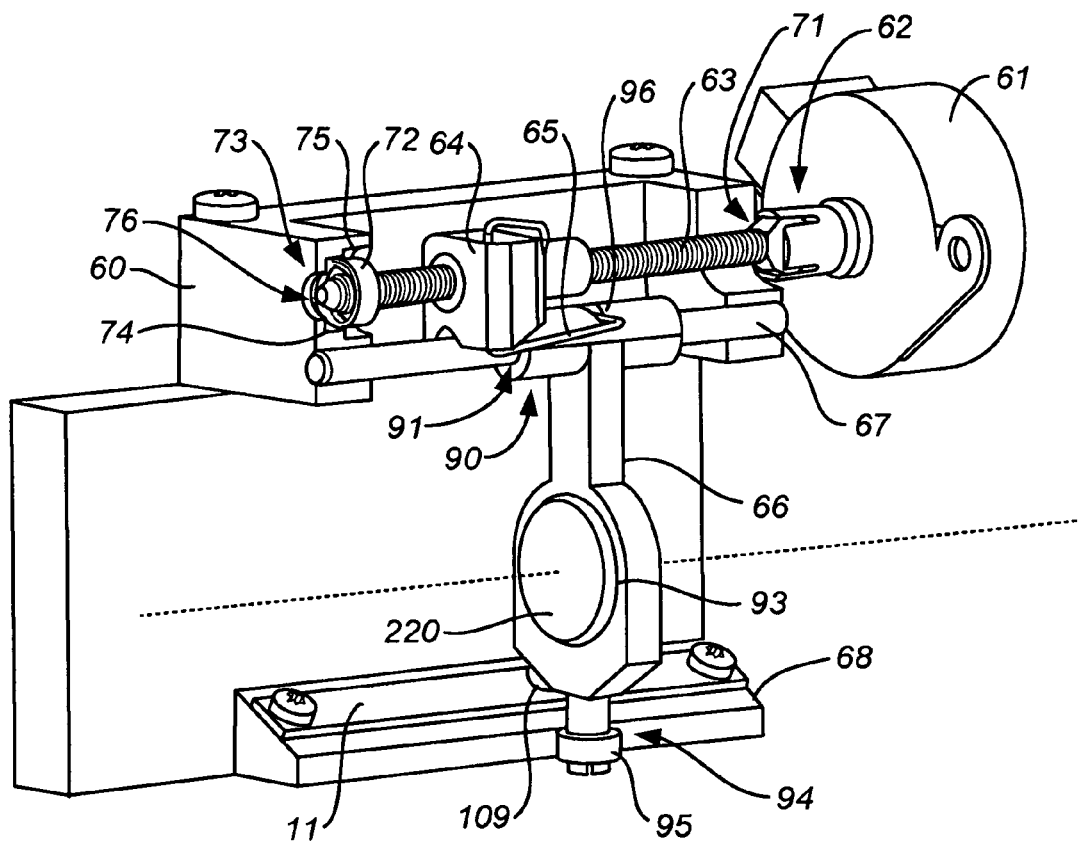
FIG. 9 illustrates an example of a positioning unit according to another embodiment of the invention.

FIG. 9 shows a perspective image of a positioning unit according to a preferred embodiment of the invention, which serves to move the focusing lens 220 or to adjust the position of the focusing lens along the optical axis of the focusing lens or along the optical axis of the telescope or camera 151, indicated by a dashed line. The positioning unit can be incorporated in a housing of the optical instrument as a modular unit or, in another embodiment, may be formed directly in the housing.

The positioning unit comprises a drive portion including a motor, a portion to transform a rotation into a translation and a guiding portion, all of which have common parts. These portions represent preferred embodiments of the invention in themselves.

The positioning unit has a frame 60, which is securely connected to the housing and has the immobile parts of the positioning unit either fixed thereto or provided thereon. The positioning unit comprises a motor 61, more precisely an electric motor, which rotates a threaded spindle 63 as a shaft via a coupling 62, the rotation of said threaded spindle 63 being converted to a linear movement by a body 64, through which the threaded spindle 63 extends and which is secured against rotation about the longitudinal axis of the threaded spindle 63, said body 64 comprising an internal thread 89 engaging the thread 70 of the threaded spindle 63. The thread 70 on the spindle 63 and the internal thread 89 of the body represent engagement structures and complementary engagement structures of the spindle 63 and the body 64, respectively, which are in engagement to transform a rotation of the spindle into a linear movement of the body 64 secured against rotation. The linear movement is transmitted, via an elastic coupling member 65, which is held on the body 64, to a member to be positioned, in the form of a lens holder 66 which holds the focusing lens 37.

Adjustability of the position of the focusing lens 37 only along its optical axis is achieved by the special guiding of the lens holder 66, wherein the lens holder 66 is guided in a direction parallel to the optical axis by a first guide 67 and a second guide 68 and the longitudinal axis of the threaded spindle 63 also extends parallel to the optical axis.

The drive portion comprises the motor 61, including a driving shaft 69, the spindle 63 with an engaging structure in the form of the external thread 70 having constant pitch, the coupling 62, which resiliently and/or elastically couples a first end 71 of the threaded spindle 63 with the motor 61 or with its drive shaft 69, respectively, rigidly with respect to rotations, and a support assembly supporting the spindle elastically at the frame 60. The support assembly comprises a bearing 72 and two elastic elements. The bearing 72 is held in a bearing seat 73 in the frame 60 by the two elastic elements in the form of elastic O-rings 74 and 75 and receives a second end 76 of the threaded spindle 63.

The threaded spindle 63 is elastically supported, at its first end 71, on the driven shaft 69 of the motor 61, via the coupling 62, and, at its second end 76, via the bearing 72 and the elastic elements or 0-rings 74 and 75, respectively, so that vibrations in axial and/or radial direction are not transmitted unrestrictedly between the motor 61 and the threaded spindle 63 or between the threaded spindle 63 and the frame 60, respectively.

However, due to manufacturing tolerances the focusing lens 220 will likely not move along the ideal path, but follow the above outlined mechanical path, deviating to some degree from the ideal path.

In an example the indicator unit retrieves a viewing direction error associated with the position of the focusing lens based on a position signal from the positioning unit and specifies at least one value indicative of the actual viewing direction in accordance with the retrieved viewing detection error.

The positioning unit may be arranged to receive an instruction value for a desired position of the focusing lens, such as from user actuated bottoms for manually focusing the optical instrument onto a target object.

According to an alternative the calibration error correction device comprises means for automatically focusing onto a target object and includes a distance determining unit to determine a distance of a target object from the optical instrument and the positioning unit may be adapted to set a position of the focusing lens along the mechanical path to focus onto the target on the basis of the determined distance, and the indicator unit is adapted to retrieve a viewing direction error associated with the target distance and to specify at least one value indicative of the actual viewing direction.

Figure 2:
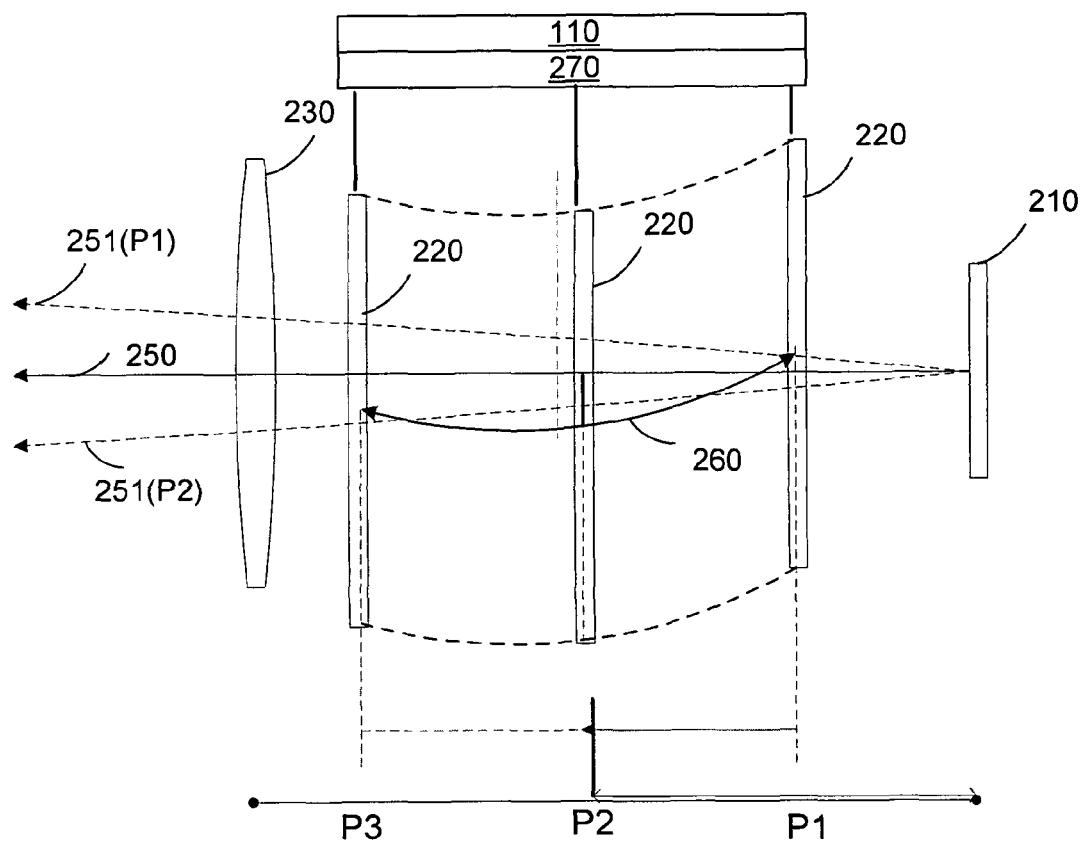
FIG. 2 illustrates elements of an optical instrument with different positions of a focusing lens and associated viewing directions.

In the following a further embodiment of the invention is described with regard to FIG. 2. FIG. 2 illustrates elements of an optical instrument for cooperation with a calibration error correction device according to another embodiment of the invention, particularly illustrating an example of a mechanical path of a focusing lens for different focus positions of an optical instrument and associated viewing directions.

FIG. 2 illustrates an image plane 210 of an optical instrument, such as the optical instrument 150 described with regard to FIG. 1. Moreover, FIG. 2 shows a lens 230, together with the image plane 210 embodying a telescope or camera of the optical instrument for determining the position of an object relative to the instrument. Moreover, FIG. 2 illustrates a focusing lens 220 at three exemplary positions P1, P2 and P3. A position of the focusing lens 220 is detected by the detector 110 and a corresponding signal indicating the position of the focusing lens along the mechanical path is output. Reference numeral 270 indicates a positioning unit for adjusting the position of the focusing lens as outlined above.

The mechanical path followed by the focusing lens for movement from the first focusing position P1 through the second focusing position P2 and the third focusing position P3 is denoted 260 and shows in an exaggerated view an exemplary deviation of the actual path of the focusing lens from a desired path of the focusing lens. The desired path of the focusing lens follows in FIG. 2 e.g. an exactly horizontal path, the center portion of the focusing lens aligned with a line from a center portion of the image plane through a center portion of the lens 230.

While the mechanical path 260 of the focusing lens in FIG. 2 is shown curved and tilted, in alternate examples a straight but tilted mechanical path may be followed by the focusing lens, e.g., a straight line tilted with regard to horizontal directions in FIG. 2. Moreover, while the focusing lens in FIG. 2 is shown always in an upright position, the focusing lens may also deviate from the upright position along the path, i.e. may be tilted to varying degrees while moving along the mechanical path.

FIG. 2 further illustrates an example of a theoretical viewing direction 250, defined in the figure by a line through the center portion if the image plane and the lens 230. However, this is an example only, in alternate embodiments the theoretical viewing direction may be defined by a line through the image plane, such as a center portion of the image plane and the focusing lens is set to a desired focus position such as an infinite focus position or may be approximated upon manufacture of the optical instrument.

According to an example the image plane includes a first line segment, e.g. vertical line segment, and a second line segment, e.g. horizontal line segment, crossing each other in the image plane and the actual viewing direction is defined by a line of sight through the crossing and the focusing lens. Accordingly, a user of the optical instrument is in the position to conveniently determine the actual viewing direction by converging the crossing and an object viewed through the focusing lens.

Generally, the theoretical viewing direction may be adjusted in connection with an initial setting of the optical instrument so that an approximation of the actual viewing direction or the actual viewing direction at a certain position of the focusing lens corresponds to zero angle indications on vertical circles and horizontal circles or corresponding digital indications of the optical instrument. For example, during initial calibration of the optical instrument the focusing lens may be moved to a predetermined focus position and the horizontal and vertical circle may be adjusted to a "zero" or initial position upon directing the line of sight or actual viewing direction of the optical instrument onto a target object.

However, the theoretical viewing direction may also be determined during assembling individual components of the optical instrument and a deviation between the theoretical viewing direction and the actual viewing direction may be determined by manufacturing tolerances or mounting tolerances of elements of the optical instrument.

FIG. 2 further illustrates a first actual viewing direction, denoted 251 assumed to be in association with the first position P1 of the focusing lens 220. As another example the illustration of FIG. 2 shows a second actual viewing direction in association with the second position P2 of the focusing lens 220.

A deviation between the respective actual viewing direction in association with the first (P1) and second (P2) position of the focusing lens and the theoretical viewing direction 250 constitutes the viewing direction error in association with the positions P1 and P2 of the focusing lens, e.g. indicated by an angle.

It is noted that a deviation of the actual viewing direction from the theoretical viewing direction may follow a deviation of the position of the focusing lens from the desired or ideal path of the focusing lens, or may lead into the opposite direction as compared to the deviation of the focusing lens. In an example of a concave focusing lens, such as used in a tachymeter or video tachymeter for example, the actual viewing direction may deviate opposite to the deviation of the focusing lens from the ideal path, whereas in case of a convex focusing lens, such as used in a leveling device, the deviation may follow the direction of the deviation of the focusing lens from the ideal path. However, as the actual viewing direction error with respect to a particular position of the focusing lens is determined, i.e. the result of the deviation of the focusing lens from the desired or ideal path, knowledge on the characteristics of the deviation of the actual viewing direction based on the type of optical arrangement or focusing lens is not essential.

In the following a further embodiment of an optical instrument for cooperation with the calibration error correcting device according to another embodiment of the invention is described with regard to FIG. 3.

Figure 3:
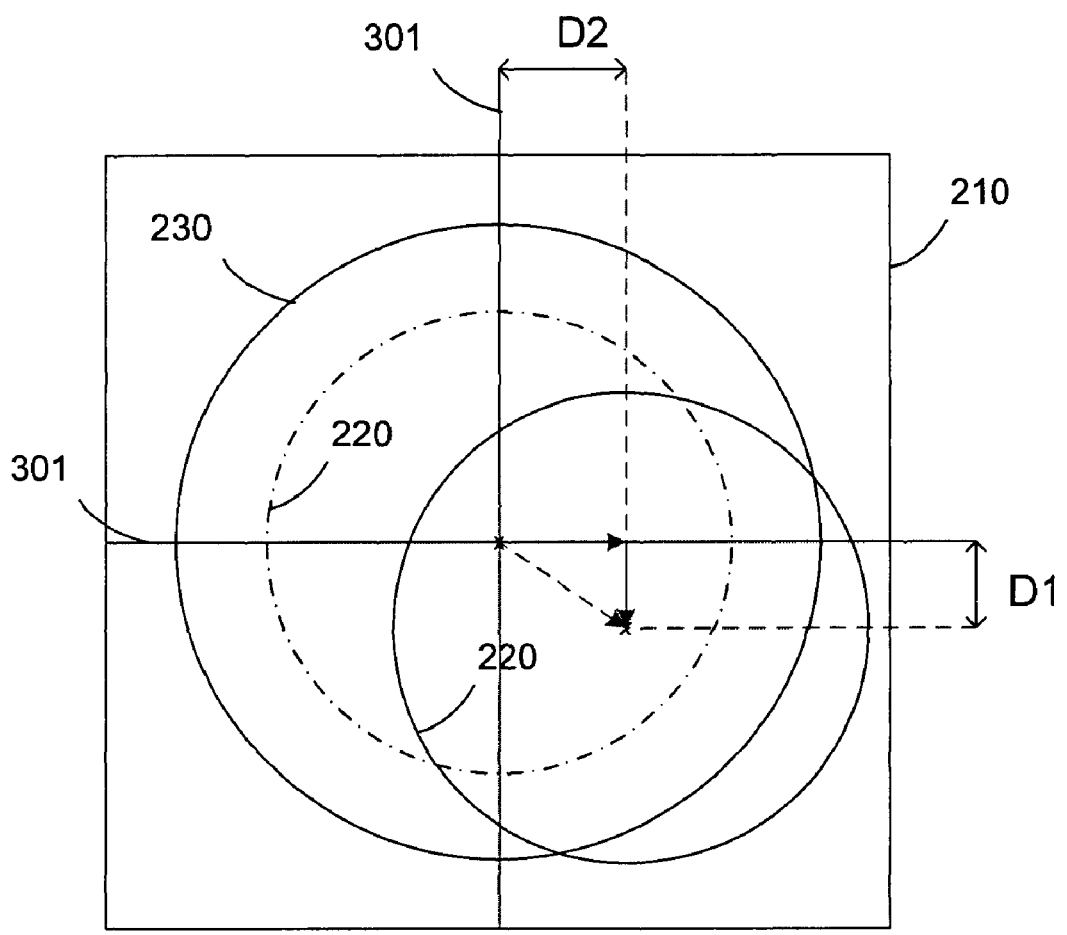
FIG. 3 illustrates elements of a calibration error detection device according to another embodiment of the invention.

FIG. 3 shows a front view of the arrangement of FIG. 2 for further illustrating the principles of the invention. FIG. 3 illustrates the image plane 210, the lens 230 of the optical instrument and the focusing lens 220. FIG. 3 shows a deviation of the focusing lens 220 from the ideal position, the ideal position of the focusing lens indicated by the broken line denoted 220. Moreover, FIG. 3 illustrates a crossing of two arbitrary orthogonal line segments such as a horizontal line segment and a vertical line segment, crossing each other in the image plane, denoted 301. The crossing of the line segments may be integrated into the image plane, such as by black line segments on an otherwise translucent image plane and may be used for directing the optical arrangement onto a target object, as known in the art.

In the example shown in FIG. 3 the theoretical viewing direction is assumed to be defined as in FIG. 2 by a line connecting a point in the image plane, preferably a point near or at the center portion of the image plane or image sensor array and a center portion of the lens 230.

If the focusing lens were actually positioned in the ideal centered position indicated by the broken line 220, the theoretical viewing direction in this example would pass through the center portion of the focusing lens in the ideal centered position and would coincide with the actual viewing direction. However, due to a deviation of the mechanical path of the focusing lens from the ideal path of the focusing lens, i.e. along the theoretical viewing direction, a deviation between the desired of the focusing lens and the actual position of the focusing lens occurs, this deviation comprising a vertical and a horizontal component denoted D1 and D2 in FIG. 3.

As a consequence of this deviation, the actual viewing direction (not shown in FIG. 3) also deviates from the ideal orientation, i.e. the theoretical viewing direction and this deviation, this deviation constituting viewing direction error. A viewing direction error as shown in the example of FIG. 3 may include two components, one constituted by a deviation in horizontal direction and one constituted by a deviation of the actual viewing direction from the theoretical viewing direction in vertical direction. If the viewing direction error is recorded as angles in spherical coordinates, the viewing direction error consists of two angle components indicating an angle deviation between the theoretical viewing direction and the actual viewing direction in two directions perpendicular to one another, such as along the vertical and horizontal line segments 301.

In a video tachymeter the image plane may be constituted by a two-dimensional array of sensor elements. A two-dimensional array of sensor elements is capable of generating image information with a number of pixels generally corresponding to the number of elements of the array. For example a sensor array of 1000×1000 sensor elements would be able to generate digital images with $10^6$ image pixels. In a video tachymeter the actual viewing direction may be defined by a line of sight from a point on or one of the elements of the two-dimensional arrangement of sensor elements, e.g. near or at the center of the array, and through the focusing lens.

Further, in a leveling device the viewing direction error also only contains one component, such as an angle or a height reading of a deviation of the actual viewing direction from the theoretical viewing direction in a vertical plan.

Figure 4:
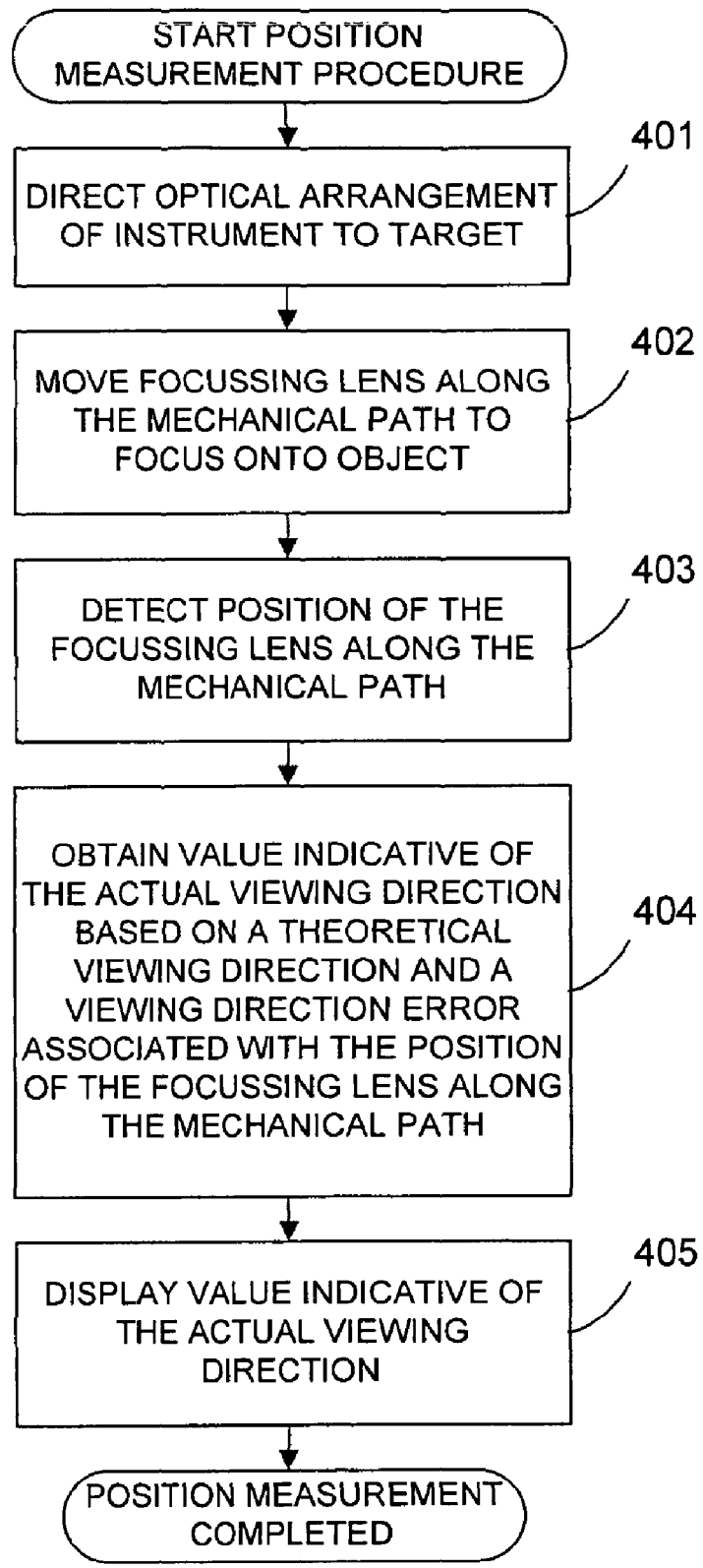
FIG. 4 illustrates operations of a method for calibration error correction according to an embodiment of the invention, particularly illustrating operations during regular use of the optical instrument.

In the following a further embodiment of the invention is described with regard to FIG. 4. FIG. 4 illustrates operations of a method for calibration error correction, such as during regular operation of an optical instrument equipped with a calibration error correcting device, such as described with regard to previous embodiments. The optical instrument cooperating and/or integrating the calibration error correction unit as described with one of the previous embodiments may be constituted by a tachymeter, a video tachymeter, leveling device or any other kind of optical instrument used for determining a position of an object relative to the optical instrument. The optical instrument preferably is set up on the basis of prepared measurements of viewing direction errors in association with individual positions of the focusing lens along the mechanical path conducted beforehand as described in subsequent embodiments or as obtained by any other technique.

In a first operation 401 after starting a position measurement procedure for measuring a position of a target object relative to an optical instrument cooperating with the calibration error correcting device, as described e.g. with regard to previous embodiments, an optical arrangement such as a telescope and/or camera of the optical instrument is directed to the target object. Directing the optical arrangement to the target in operation 401 preferably includes adjusting the optical arrangement such that a target object is aligned with an indication on an image plane, such as the crossing of vertical and horizontal lines outlined with regard to FIG. 3. By directing the optical arrangement to the target the actual viewing direction is adjusted to point to the target object.

In a subsequent operation 402 the focusing lens is moved along the mechanical path to focus onto the target object, e.g. manually or automatically in accordance with the embodiments described earlier. Operations 401 and 402 may be repeatedly carried out to finally direct the telescope to the target while adjusting the focus.

In an operation 403, after focusing the optical instrument onto the target with operations 401 and 402, the position of the focusing lens is detected, i.e. the position of the focusing lens along the mechanical path, as for example outlined with regard to previous embodiments.

Subsequently, a value indicative of the actual viewing direction is determined, e.g. by reading a corresponding indication of angles on a horizontal and/or vertical circle or a corresponding signal provided by the optical instrument and a value indicative of the actual viewing direction based on the theoretical viewing direction and a viewing direction error associated with the position of the focusing lens detected beforehand is obtained. As outlined before, this may include retrieving a viewing direction error associated with the detected position of the focusing lens from a memory, e.g. memory 120 described with regard to FIG. 1 and by appropriately processing the viewing direction error and the known theoretical viewing direction as adjusted beforehand as described e.g. in previous embodiments. For example, the viewing direction error may be subtracted from the theoretical viewing direction in order to obtain the value indicative of the actual viewing direction, i.e. the corrected viewing direction. During regular operation, as the instrument is assumed to be calibrated or initially adjusted by defining the theoretical viewing direction and adjusting an initial or "0" setting of the horizontal circle and vertical circle or other angle or position indicating device based thereon, during regular operation the instruments provides a position measurement based on the theoretical viewing direction that, however, only is an approximation of the actual viewing direction.

By subtracting or otherwise removing the viewing direction error from the actual measurement of the viewing direction, i.e. the theoretical viewing direction, a corrected value indicative of the actual viewing direction can be obtained. In other words, the viewing direction error determined beforehand in association with the present position of the focusing lens is removed from an actual measurement of the optical instrument, the theoretical viewing direction, such as angular values on a horizontal and vertical circle or corresponding numerical indications.

It is noted that values indicating the theoretical viewing direction or actual measurement of a position of the target object may not be displayed or otherwise indicated to a user, only the corrected value indicative of the actual viewing direction or position of the target object may be indicated.

In an operation 405 the value indicative of the actual viewing direction, i.e. the corrected theoretical viewing direction is displayed or otherwise made available to a user or further equipment.

The displayed value for a tachymeter or video tachymeter may include two angle components for specifying the spherical coordinates of the target object relative to the device. In a leveling device, the displayed value indicative of the actual viewing direction may include an angular value indicating a deviation of the position of the object in a vertical direction.

Operation 405 may be followed by further operations, measurements or computations of values indicative of the position of the object that, however, are not described further.

According to the present embodiment, as viewing direction errors are pre-stored and readily available for use in association with a particular selected position of the focusing lens along the mechanical path, corrected indications of the actual viewing direction can be directly-provided, leading to improved accuracy and improved handling of the optical instrument.

Figure 5:
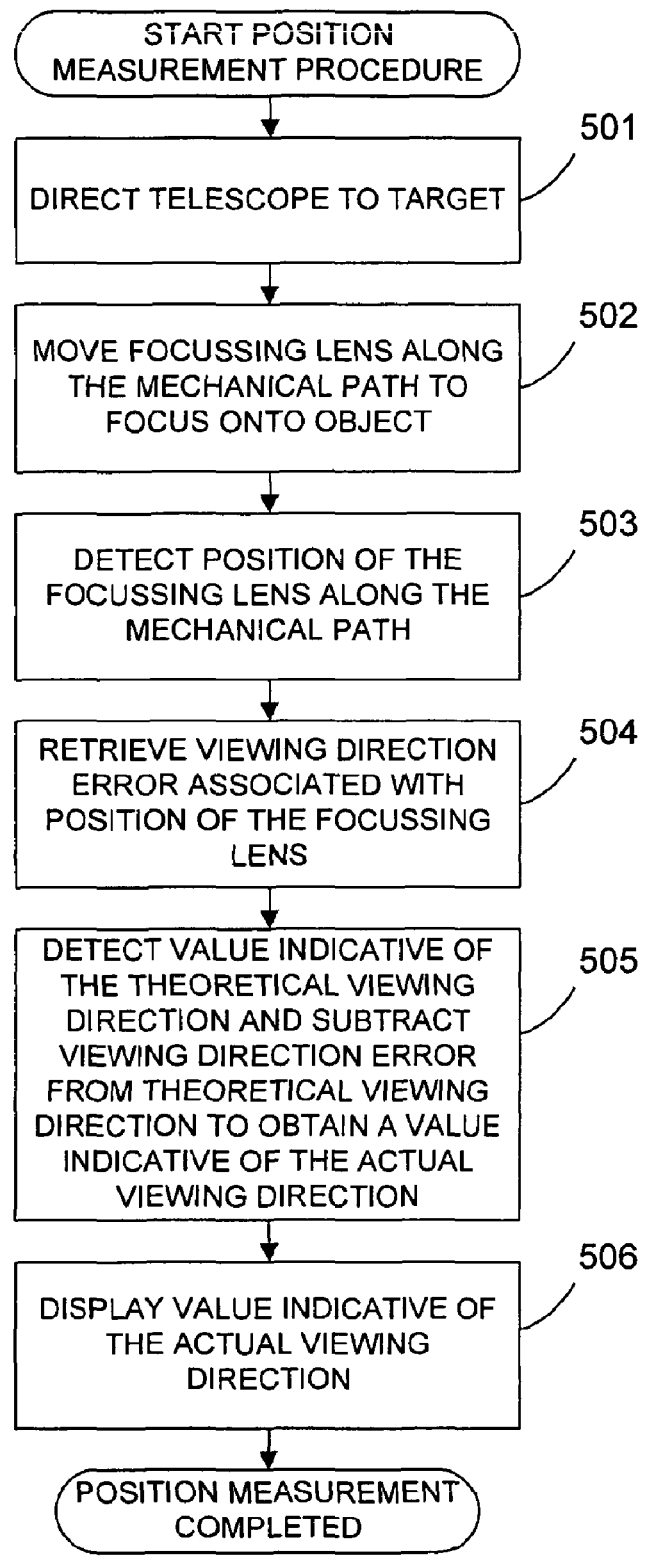
FIG. 5 illustrates operations of a method according to an embodiment of invention, particularly illustrating operations for calibration error correction during use of the optical instrument.

In the following a further embodiment of the invention is described with regard to FIG. 5. FIG. 5 illustrates operations of a method for performing a calibration error correction for an optical instrument according to another embodiment of the invention, particularly illustrating operations for determining a corrected value indicative of the actual viewing direction.

In a first operation 501 a second operation 502 the optical instrument, e.g. the telescope or camera is directed to a target object and the focusing lens is moved along the mechanical path to focus onto the object, as outlined with regard to operations 401 and 402. In an operation 503 the position of the focusing lens along the mechanical path is detected, as in operation 403.

In operation 504 the viewing direction error associated with the position of the focusing lens is retrieved from the memory, e.g. by retrieving one or two optical viewing direction error elements stored in association with the position of the focusing lens.

In an operation 505 the obtained viewing direction error is removed from a measured theoretical viewing direction to obtain a value indicative of the corrected actual viewing direction. For example, the viewing direction error is subtracted from the actually measured value of the theoretical viewing direction. The subtraction or otherwise removal of the viewing direction error may be performed component by component, such as the two elements of a viewing direction error may be subtracted from two elements of the theoretical viewing direction of the target object.

It is noted that it is important to determine viewing direction errors during calibration of the instrument based on the theoretical viewing direction that is later used during actual measurement, i.e. the same settings used for initially defining the theoretical viewing direction and associating same with a reference setting of the instrument. E.g. the theoretical viewing direction may be determined by setting the focusing lens to a defined position and the so defined viewing direction is associated with a "0" or initial setting of the instrument and this association is maintained for measuring viewing direction errors for different positions of the focusing lens and for actual position measurements.

In operation 506 the value indicative of the actual viewing direction is displayed or otherwise made available, as in operation 406.

Figure 6:
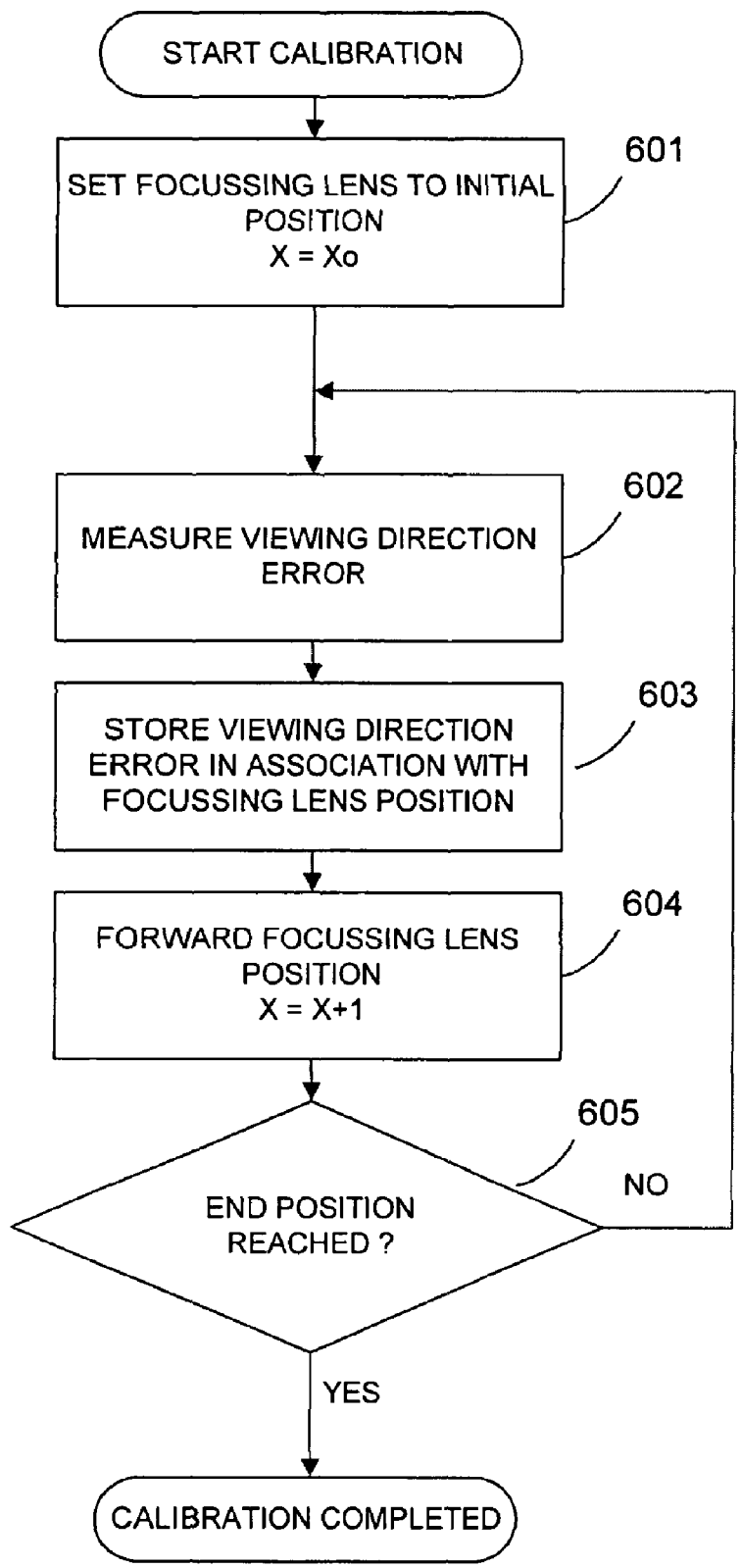
FIG. 6 illustrates operations of a method for calibration error correction according to another embodiment of the invention, particularly outlining operations for recording viewing direction errors in association with focusing lens positions.

In the following a further embodiment of the invention is described with regard to FIG. 6. FIG. 6 illustrates elements of a method for calibrating an optical instrument cooperating with a calibration error correcting device according to another embodiment of the invention.

Viewing direction errors associated with specific positions of the focusing lens along the mechanical path can conveniently be recorded during an initial calibration when manufacturing the optical instrument or when performing maintenance activities. In order to obtain viewing direction errors associated with a certain position the optical instrument can be adjusted to focus to a known target object in a known position relative to the optical instrument the deviation between the line of sight, i.e. the actual viewing direction, i.e. the known direction towards the target object in the known position with regard to the optical instrument and the theoretical viewing direction, e.g. a value indicative for the theoretical viewing direction indicated by for example a vertical and horizontal circle of the instrument and the desired known angles that should be indicated on the basis of the target object in the known position relative to the device, constitute the viewing direction error for this specific known position of the target object. Accordingly, with this first measurement a first viewing direction error for a first position is obtained. Subsequently, the distance of the target object with regard to the optical instrument could be modified to obtain by a corresponding measurement a second viewing direction error for a second position of the focusing lens along the mechanical path.

By this process multiple viewing direction errors for multiple positions of the focusing lens can be determined for viewing error correction during later operation of the device. Alternatively to the above outlined steps for measuring viewing direction errors, viewing direction errors can also be obtained by measuring a position of a target object with regard to the optical instrument in two faces of a telescope of the optical instrument, as outlined below.

It should be noted that the technique for obtaining viewing direction errors can be varied, as long as the viewing direction error correctly specifies a deviation of the actual viewing direction from the theoretical viewing direction, i.e., indicates a deviation between a known position of a target object relative to the optical instrument and an indicated position of the known object relative to the optical instrument.

FIG. 6 particularly outlines operations for calibrating the device, by recording viewing direction errors as in multiple positions of the focusing lens.

The calibration of the optical instrument integrating or cooperating with the calibration error correcting device starts with an operation 601 including setting the focusing lens to an initial position $X=X_0$. Setting the focusing lens to the initial position may be achieved by focusing the object onto a target in a known distance and direction, i.e. position from the optical instrument.

Subsequently, in an operation 602 the viewing direction error at the position $x\theta$ is measured. Measuring the viewing direction error may be accomplished as it was outlined with regard to previous embodiments.

In an operation 603 the viewing direction error in association with the present focusing lens position $X_0$ is stored such as in the memory 120 of FIG. 1.

In an operation 604 the focusing lens is forwarded to a position $X=X+1$, such as by a drive motor and a spindle as outlined earlier. "1" in the present example constitutes unit distance for advancing the focusing lens.

In an operation 605 it is determined whether a predetermined end position is reached. The end position could for example be a position for infinite focus or a position for a nearest focus. Alternatively, the end position could be determined by mechanical constrains, i.e. an end point of the mechanical path of the focusing lens.

If it is decided in operation 605 that the end position is not reached, the preceding operations 602-604 are repeated based on the position X+1. The loop of operations 602-605 is repeated until the end position of the focusing lens is reached, i.e., until the decision in operation 605 is "YES" in which case the calibration or recording of viewing direction errors is completed.

In practical applications viewing direction errors will be recorded for a plurality of possible positions of the focusing lens along the mechanical path, however, the number of positions cannot be increased infinitely. Limitations may be imposed by a capacity of the memory 120 for storing the viewing direction errors and/or efforts that can be made for recording viewing direction errors at various positions.

In order to be able to work with a limited number of viewing direction errors in association with a corresponding number of different positions of the focusing lens, the indicator unit in another example is arranged to specify the actual viewing direction based on an interpolation between two viewing direction errors, e.g., if a present position of the focusing lens along the mechanical path is not associated with a stored viewing direction error. Preferably, a linear interpolation between two viewing direction errors may be used, however, any other type of interpolation is conceivable.

For example, if it is determined that a particular present position of the focusing lens is not associated with a viewing direction error, the two neighboring viewing direction errors may be retrieved by the indicator and these two error values may be interpolated on the basis of the current position detected and the positions associated with the neighboring viewing direction errors.

As noted above, viewing direction errors at individual positions of the focusing lens along the mechanical path can be determined and stored in the memory 120. In order to improve the speed of obtaining viewing direction errors, the calibration error correction device may include a calibration unit to automatically effect movement of the focusing lens to each of a plurality of positions along the mechanical path and to determine viewing direction errors thereat.

For example, a control may be devised for automatically focusing the optical instrument onto an object in a known position with regard to the optical instrument and to determine a viewing error thereat, i.e. the deviation between the actual viewing direction and the theoretical viewing direction, in other words the difference between a position measured by the optical instrument and the known position of the object. The calibration unit in this example then automatically moves the optical instrument and/or the target object into another distance relation with regard to one another, in order to achieve movement of the focusing lens to another position along the mechanical path. Again a measurement of the viewing direction error can be performed and the process can be repeated for further distance relations between the optical instrument and the target object.

The calibration unit may include an arrangement of a rail for holding the target object and the optical instrument and for stepwise moving the optical instrument and/or the target object into a plurality of different distance relations with regard to one another. Moreover, the calibration unit in an example includes an instructor to trigger focusing the optical instrument to the target object in the new distance and by triggering measurement of a viewing direction error in this case.

An arrangement of drive motors can be provided for moving the object and/or optical instrument along the rail into a number of different distance relations with regard to one another. The steps of moving the device and/or target object may be equidistant from a smallest distance to a largest distance corresponding or approximating infinite distance.

Alternatively, the intervals for movement may be chosen logarithmically with larger distances corresponding to larger intervals.

As noted above, the optical instrument may be constituted by a leveling device, and in this case the calibration unit may be adapted to adjust the line of sight or actual viewing direction to targets on the same elevation as the optical instrument, e.g. by setting actuators or a stepper motor for adjusting the optical instrument, and to record a height reading of the optical instrument to horizontal direction as viewing direction error in association with different distances.

Moreover, as noted above, the calibration error correction device may be constituted by a tachymeter or video tachymeter, and in this case the calibration unit can be adapted to determine a viewing direction error as a mean between a measurement of a viewing direction error of the optical instrument in a first face and a measurement of a viewing direction error of the optical instrument in a second face. In this connection the expression "face" of the optical instrument refers to a first position of a telescope or camera in a base unit directed to a target, and the second face refers to a 180° rotated telescope or camera around a vertical axis and a rotation of the telescope or camera around a horizontal axis, this rotation covering 360° minus a vertical angle set for a measurement in the first face, if a 0° angle is assumed to be the zenith.

Moreover, in order to improve the determination accuracy of viewing direction errors the calibration unit may be adapted to determine viewing direction errors associated with positions of the focusing lens as a mean between repeated measurements of viewing direction errors at a particular position of the focusing lens.

In case of a video tachymeter the calibration unit may be adapted to determine a viewing direction error as a mean between repeated measurements of viewing direction errors at two different positions of the focusing lens along the mechanical path, wherein the viewing direction error is associated with a middle position of the focusing lens along the mechanical path between the two different positions.

According to another example the calibration error correction device includes a unit to measure and compensate for a tilt error of the optical instrument with regard to a vertical direction, in order to further improve measurements. More precisely, the tilt error is a deviation or angle between the vertical axis of the instrument about which the telescope or camera, i.e. the actual viewing direction rotates and e.g. the vertical direction. It is noted that the tilt error can be considered as being independent of a focusing lens position and therefore can be compensated for independent of an actual position of the focusing lens, e.g. when setting up the optical instrument in preparation of a positioning application.

The above embodiment thus provides for convenient recording of viewing direction errors in association with different positions of the focusing lens along the mechanical path for later use during regular operation of the device.

Figure 7:
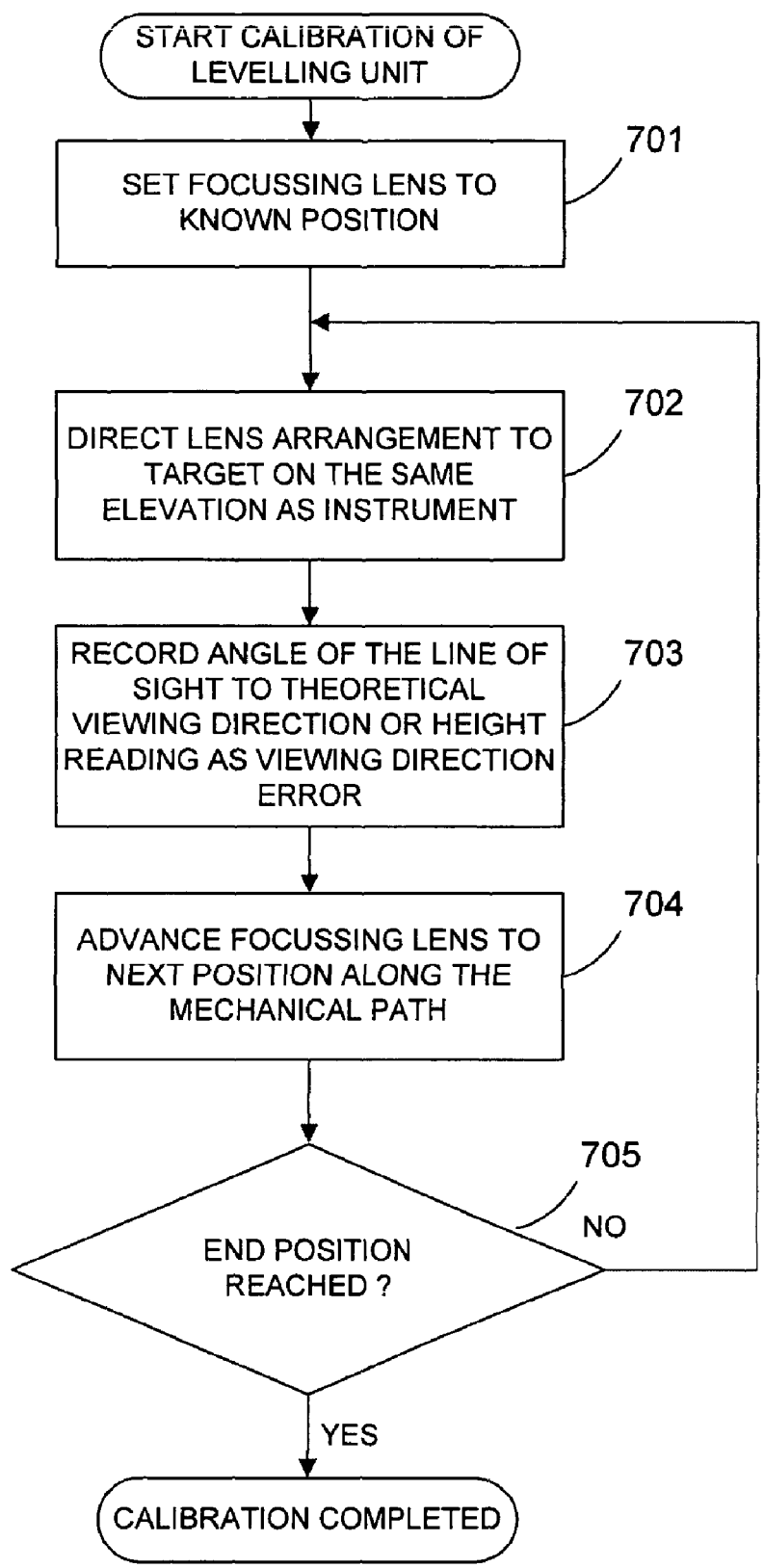
FIG. 7 illustrates operations of a method for calibration error correction according to another embodiment of the invention, particularly outlining operations for recording viewing direction errors for a leveling device.

In the following a further embodiment of the invention is described with regard to FIG. 7. FIG. 7 illustrates operations of a method for calibration error correction, particularly focusing on calibrating or recording of viewing direction angles of optical instruments including or constituting a leveling device. A leveling device, as known in the art, is a device for measuring the position of a target object relative to the leveling device in vertical direction, e.g. to determine whether the leveling device and the object are on the same elevation. Viewing direction errors therefore only include a single component indicative of an error in the vertical direction.

In an operation 701 the focusing lens is set to a known position, e.g. an initial position a viewing direction error is required for.

In operation 702 the optical arrangement thereof is directed to a target object on the same elevation as the optical instrument.

In an operation 703 a viewing direction error is recorded as an angle of the line of sight, i.e. actual viewing direction, to the predefined theoretical viewing direction in association with the present position of the focusing lens. The viewing direction error is stored as outlined with regard to previous embodiments.

In an operation 704 the focusing lens is advanced to a next position along the mechanical path and operations 701-703 are repeated, in order to obtain a viewing direction error at further positions of the focusing lens. These operations are repeated until an end position of the focusing lens is reached.

In an operation 705 it is determined whether a predetermined end position is reached, as for example described with regard to operation 605. If it is decided in operation 705 that the end position is not reached, the preceding operations 702-704 are repeated based on the next position. The loop of operations 702-705 is repeated until the end position of the focusing lens is reached, i.e., until the decision in operation 605 is "YES".

The embodiment of FIG. 7 substantially thus corresponds to the previous embodiments reduced to a viewing direction error with a single dimension.

Figure 8:
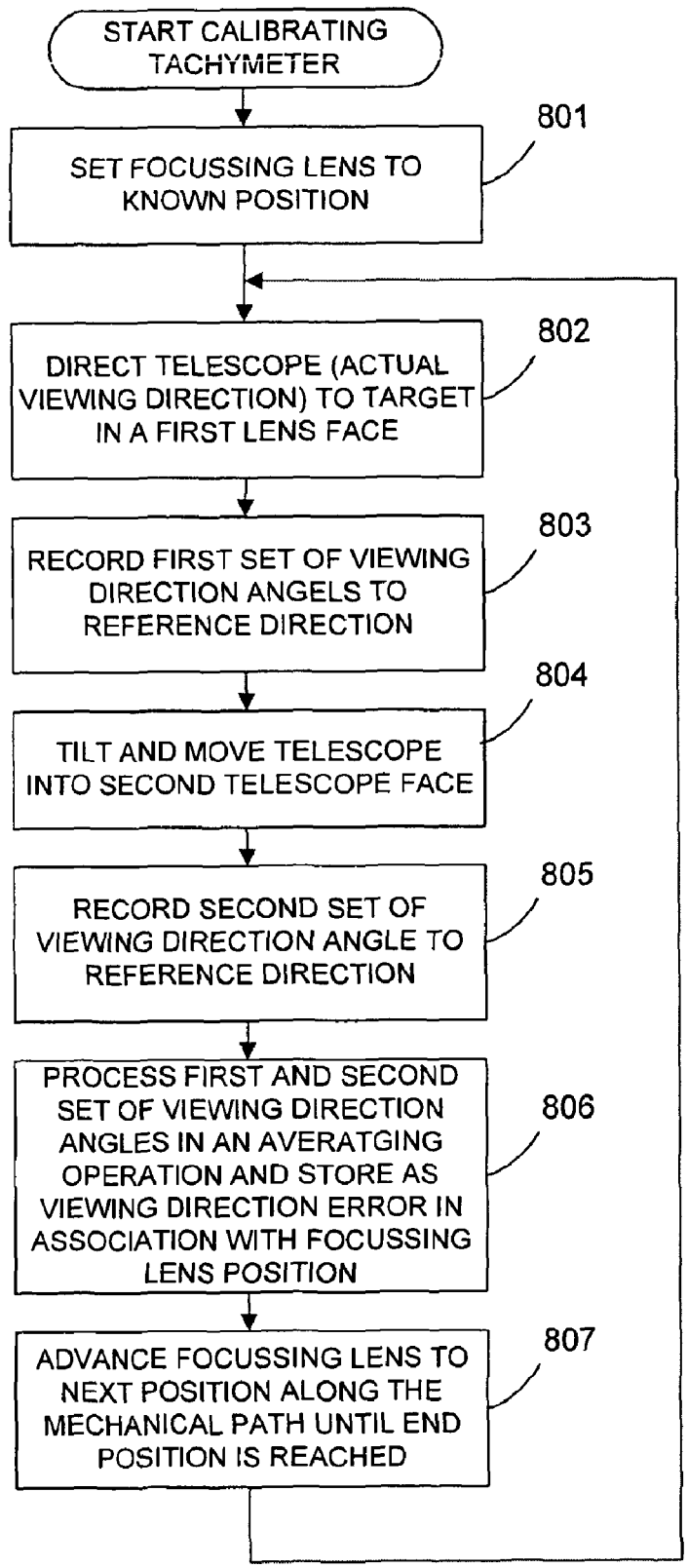
FIG. 8 illustrates operations of a method for calibration error correction according to another embodiment of the invention, particularly outlining operations for recording viewing direction errors for example for a Tachymeter or video Tachymeter.

In the following a further embodiment of the invention is described with regard to FIG. 8. FIG. 8 illustrates operations of a method for calibration error correction, particularly focusing on recording viewing direction errors at different positions of the focusing lens. In the embodiment of FIG. 8 the optical instrument is constituted by a tachymeter with the ability to be moved into different faces, i.e. a tachymeter allowing at least a 180° rotation of an optical arrangement such as telescope or camera of the Tachymeter about a horizontal axis.

In a first operation 801 the focusing lens is set to a known position, as outlined before. In an operation 802 the telescope of the Tachymeter is directed to the target object in a first telescope face, i.e., the actual viewing direction is adjusted onto the object.

In an operation 803 a first set of viewing direction angles to the theoretical or reference direction is measured, such as in spherical coordinates.

In an operation 804 the optical arrangement of the tachymeter is tilted about the horizontal axis by 180 degrees and moved into a second face, i.e., the optical arrangement after the 180 degree rotation about the horizontal axis is rotated about the vertical axis to again target the object.

In an operation 805 a second set of viewing direction angles to the theoretical viewing direction is measured.

In an operation 806 the first and second set of viewing direction angles is processed in an averaging operation to determine a mean value and stored as viewing direction error in association with the present focusing lens position.

In an operation 807 the focusing lens is then advanced to a next position along the mechanical path and operations 802-807 are repeated, until an end position of the focusing lens along the mechanical path is reached.

The embodiment of FIG. 8 illustrates recording of viewing direction errors by focusing onto a target in a known distance into lens faces and by calculating the viewing direction error on the basis of the two measurements. Thus becomes possible to record or update viewing direction errors without a complex mechanical arrangement and adjustment, only a target object in a known distance associated with a focusing lens position is required.

According to another embodiment a program may be provided including instructions adapted to cause a data processor of the error correction device to carry out combinations of the above operations. The program or elements thereof may be stored in a memory of the correction device, such as the memory 120 and retrieved by the processor for execution. Moreover, a computer readable medium may be provided in which the program is embodied. The computer readable medium may be tangible such as a disc or other data carrier or may be constituted by signals suitable for electronic transmission. A computer program product may comprise the computer readable medium.

Figure 10:
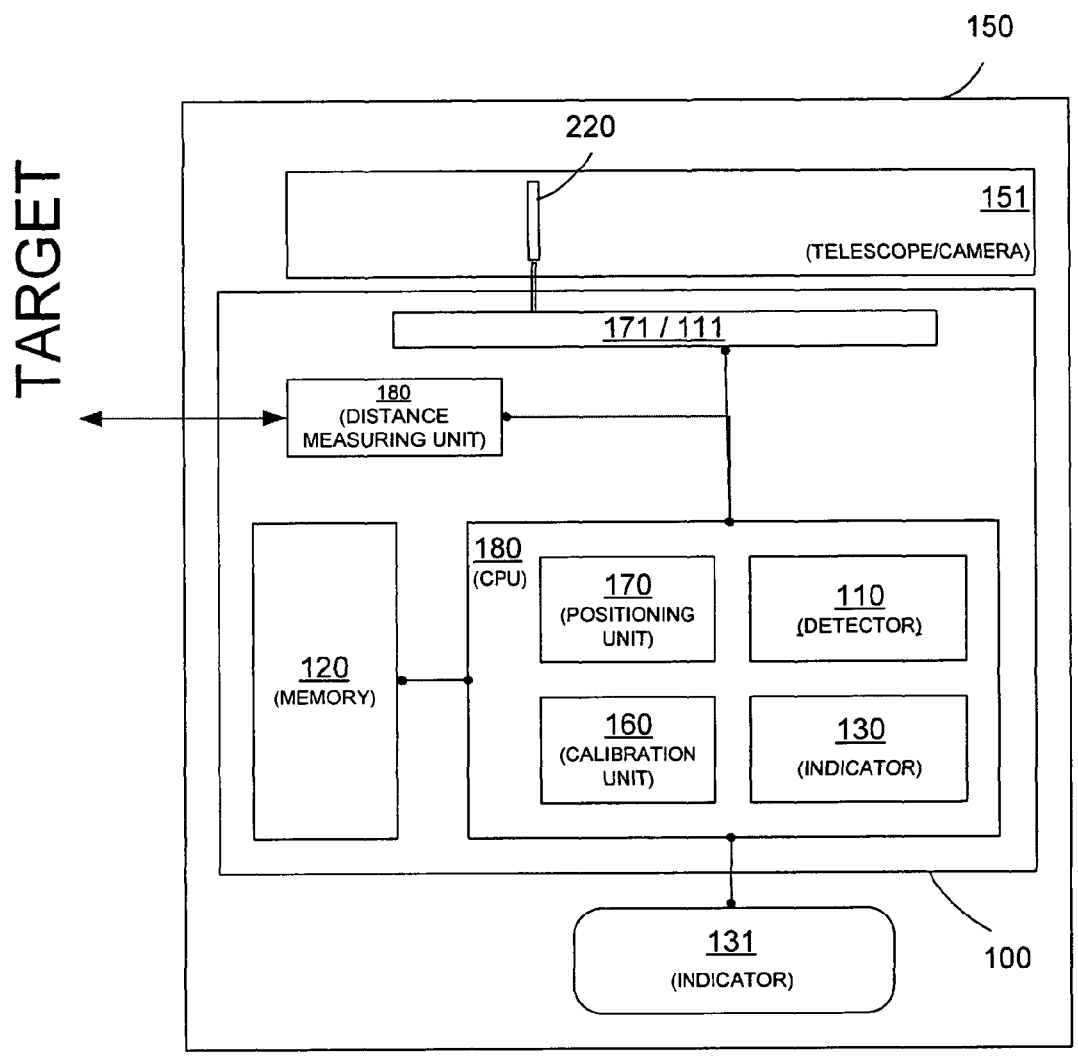
FIG. 10 illustrates elements of a calibration error correction device in an optical instrument according to an embodiment of the invention.

FIG. 10 illustrates elements of a calibration error correction device in an optical instrument according to an embodiment of the invention. FIG. 10 schematically shows the elements of the optical instruments as outlined with regard to the above embodiments. FIG. 10 illustrates the calibration error correcting device 100 including the detector 110, the detector being partially realized by the CPU 183 and by a sensor 111 sensing the position of the focusing length 220. such as by directly determining the position of the focusing lens or by counting the impulses of the stepper motor, etc.

Moreover, FIG. 10 illustrates a positioning unit, partially realized by the CPU 180, as outlined above, and partially realized by a mechanical arrangement 171, including a motor for moving the focusing lens 220 along the mechanical path. Still further, FIG. 10 illustrates the indicator unit 130, partially realized by the CPU 180, as outlined above, and by an indicator unit 131 such as a display for visualizing values indicative of the viewing direction.

Moreover, FIG. 10 illustrates a distance measuring unit 180 for measuring a distance of the optical instrument from a target and for providing a corresponding measurement value to the CPU 180. For example, the distance measuring unit 180 includes an infrared or a laser distance measurement device as known in the art.

The distance determining unit in this example provides for a distance measurement value indicating a distance of a target object from the optical instrument and provides this distance value to the positioning unit. The position unit in turn determines and sets a required position of the focusing lens based on the distance signal in order to focus the optical instrument onto the target object. The distance indication from the distance determining unit and/or the position from the positioning unit may then be used by the detection unit to directly determine a viewing direction error in association with the position or to transform the distance indication into a position signal for retrieving associated viewing direction errors. Alternatively, the distance indication form the distance determining unit may directly be used to retrieve a viewing direction error from the memory stored in association with the distance indication.

As the position of the focusing lens along the mechanical path of the focusing lens in the optical instrument is a function of the a distance of a target object, either the value indicating the position of the focusing lens or the distance indication may be used for storing and later retrieving viewing direction errors for correcting an actual viewing direction.

According to another embodiment a program can be provided including instructions adapted to cause data processing means to carry out a method with the features of the above described embodiments.

According to another example a computer readable medium embodying the program may be provided.

According to another embodiment a computer program product may comprise the computer readable medium.

According to another embodiment an optical instrument is provided comprising the calibration error correction device.

According to another embodiment an optical instrument is provided, calibrated in accordance with the above method steps of the above described embodiments.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A calibration error correction device for an optical instrument, the device comprising:
a detector configured to detect a position of a focusing lens of an optical instrument along a mechanical path of the focusing lens, wherein a line of sight through an image plane of the optical instrument and the focusing lens at a present position defines an actual viewing direction;
a memory configured to store viewing direction errors specifying a deviation between a known theoretical viewing direction and the actual viewing direction associated with a plurality of different positions of the focusing lens along the mechanical path; and
an indicator of at least one value indicative of the actual viewing direction based on the theoretical viewing direction and the viewing direction errors at each of the different positions of the focusing lens along the mechanical path.

2. The calibration error correction device of claim 1 wherein the viewing direction errors are defined by a difference between the theoretical viewing direction and the actual viewing direction and wherein the indicator is arranged to specify the actual viewing direction by subtracting the viewing direction errors from the theoretical viewing direction.

3. The calibration error correction device of claim 1 wherein the viewing direction errors each comprise a first component indicating a deviation between the theoretical viewing direction and the actual viewing direction in a first plane.

4. The calibration error correction device of claim 1 wherein the viewing direction errors each comprise a second component indicating a deviation between the theoretical viewing direction and the actual viewing direction in a second plane.

5. The calibration error correction device of claim 1 wherein the image plane includes mutually orthogonal first and second line segments crossing each other in the image plane and wherein the actual viewing direction is defined by a line of sight through the crossing and the focusing lens.

6. The calibration error correction device of claim 1 wherein the image plane comprises a two-dimensional array of sensor elements and wherein the actual viewing direction is defined by a line of sight through a point of the two-dimensional arrangement of sensor elements and through the focusing lens.

7. The calibration error correction device of claim 1 further comprising a positioning unit operable to position the focusing lens to focus onto a target and to indicate the position of the focusing lens along the mechanical path, wherein the indicator is operable to retrieve a viewing direction error associated with the position of the focusing lens based on the position signal indicated by the positioning unit and to specify at least one value indicative of the actual viewing direction.

8. The calibration error correction device of claim 1 further comprising a distance determining unit to determine a target distance of a target from the optical instrument, wherein the positioning unit is operable to set a position of the focusing lens along the mechanical path to focus onto the target based on the target distance and the indicator is adapted to retrieve from the memory a viewing direction error associated with the target distance and to specify at least one value indicative of the actual viewing direction.

9. The calibration error correction device of claim 1 wherein the indicator is operable to specify the actual viewing direction based on an interpolation between two viewing direction errors, if a present position of the focusing lens along the mechanical path is not associated with a stored viewing direction error.

10. The calibration error correction device of claim 1 further comprising a calibration unit operable to effect movement of the focusing lens to each of the plurality of positions along the mechanical path and to determine viewing direction errors associated therewith.

11. The calibration error correction device of claim 10 wherein the calibration unit is operable to adjust the line of sight or actual viewing direction to targets on the same elevation as the optical instrument and to record an angle of the optical instrument to horizontal direction as viewing direction error.

12. The calibration error correction device of claim 10 wherein the calibration unit is adapted to determine a viewing direction error as a mean between a measurement of a viewing direction error of the optical instrument in a first face and a measurement of a viewing direction error of the optical instrument in a second face.

13. The calibration error correction device of claim 10 wherein the calibration unit is operable to determine a viewing direction error associated with a position of the focusing lens along the mechanical path as a mean between repeated measurements of viewing direction errors at this position of the focusing lens along the mechanical path.

14. The calibration error correction device of claim 10 wherein the calibration unit is operable to determine a viewing direction error as a mean between repeated measurements of viewing direction errors at two different positions of the focusing lens along the mechanical path and wherein the viewing direction error is associated with a middle position of the focusing lens along the mechanical path between the two different positions.

15. The calibration error correction device of claim 1 further comprising a unit operable to measure and compensate for a tilt error.

16. A method for calibration error correction in an optical instrument, the method comprising:
    detecting a position of a focusing lens of an optical instrument along a mechanical path of the focusing lens, wherein a line of sight through an image plane of the optical instrument and the focusing lens at a present position defines an actual viewing direction;
    holding viewing direction errors specifying a deviation between a known theoretical viewing direction and the actual viewing direction associated with a plurality of different positions of the focusing lens along the mechanical path in a memory; and
    specifying at least one value indicative of the actual viewing direction based on the theoretical viewing direction and the viewing direction errors at each of the different positions of the focusing lens along the mechanical path.

17. The method of claim 16 wherein the viewing direction errors are defined by a difference between the theoretical viewing direction and the actual viewing direction and wherein the indicator is arranged to specify the actual viewing direction by subtracting the viewing direction errors from the theoretical viewing direction.

18. The method of claim 16 wherein the viewing direction errors each comprise a first component indicating a deviation between the theoretical viewing direction and the actual viewing direction in a first plane.

19. The method of claim 16 wherein the viewing direction errors each comprise a second component indicating a deviation between the theoretical viewing direction and the actual viewing direction in a second plane.

20. The method of claim 16 further comprising providing an image plane including mutually orthogonal first and second line segments crossing each other in the image plane and defining the actual viewing direction by a line of sight through the crossing and the focusing lens.

21. The method of claim 16 further including providing an image plane constituted by a two-dimensional array of sensor elements and defining the actual viewing direction by a line of sight through a point of the two-dimensional arrangement of sensor elements and through the focusing lens.

22. The method of claim 16 wherein the theoretical viewing direction is calibrated by setting the focusing lens to a selected focus position.

23. The method of claim 16 wherein the theoretical viewing direction is calibrated by substantially aligning the actual viewing direction with the theoretical viewing upon manufacture of the optical instrument.

24. The method of claim 16 further comprising:
    positioning the focusing lens to focus onto a target and indicating the position of the focusing lens along the mechanical path;
    retrieving a viewing direction error associated with the position of the focusing lens based on a position signal indicated by a positioning unit; and
    specifying at least one value indicative of the actual viewing direction.

25. The method of claim 16 further comprising determining a target distance of a target from the optical instrument;
    setting a position of the focusing lens along the mechanical path to focus onto the target based on the target distance; and
    retrieving a viewing direction error associated with the target distance and to specify at least one value indicative of the actual viewing direction.

26. The method of claim 16 further comprising specifying the actual viewing direction based on an interpolation between two viewing direction errors, if a present position of the focusing lens along the mechanical path is not associated with a stored viewing direction error.

27. The method of claim 16 further comprising:
    moving the focusing lens to each of the plurality of positions along the mechanical path; and
    determining viewing direction errors thereat.

28. The method of claim 27 further comprising adjusting the line of sight or actual viewing direction to targets on the same elevation as the optical instrument and to record an angle of the optical instrument to horizontal direction as viewing direction error.

29. The method of claim 27 further comprising determining a viewing direction error as a mean between a measurement of a viewing direction error of the optical instrument in a first face and a measurement of a viewing direction error of the optical instrument in a second face.

30. The method of claim 16 further comprising determining a viewing direction error associated with a position of the focusing lens along the mechanical path as a mean between repeated measurements of viewing direction errors at this position of the focusing lens along the mechanical path.

31. The method of claim 16 further comprising determining a viewing direction error as a mean between repeated measurements of viewing direction errors at two different positions of the focusing lens along the mechanical path and wherein the viewing direction error is associated with a middle position of the focusing lens along the mechanical path between the two different positions.

32. The method of claim 16 further comprising measuring and compensating for a tilt error.

* * * * *